United States Patent
Melz et al.

(10) Patent No.: US 7,547,062 B2
(45) Date of Patent: Jun. 16, 2009

(54) DEVICE FOR A MOTOR VEHICLE THAT AFFORDS OCCUPANT PROTECTION DURING THE IMPACT OF ENERGY DIRECTED AGAINST A MOTOR VEHICLE DOOR AS A RESULT OF A COLLISION

(75) Inventors: Tobias Melz, Darmstadt (DE); Ho-Sung Kang, Antony (FR); Eric Zimmerman, Kassel (DE)

(73) Assignee: Fraunhofer-Gesellschaft zur Förderung der Angewandten Forschung E.V, Munich (DE)

( * ) Notice: Subject to any disclaimer, the term of this patent is extended or adjusted under 35 U.S.C. 154(b) by 27 days.

(21) Appl. No.: 10/582,219

(22) PCT Filed: Aug. 31, 2004

(86) PCT No.: PCT/EP2004/009695

§ 371 (c)(1),
(2), (4) Date: Apr. 12, 2007

(87) PCT Pub. No.: WO2005/061308

PCT Pub. Date: Jul. 7, 2005

(65) Prior Publication Data

US 2007/0256877 A1    Nov. 8, 2007

(30) Foreign Application Priority Data

Dec. 11, 2003   (DE) .............................. 103 58 023

(51) Int. Cl.
*B60R 21/02* (2006.01)
*B60R 21/01* (2006.01)

(52) U.S. Cl. .............................................. 296/187.12
(58) Field of Classification Search ............ 296/187.03, 296/187.12
See application file for complete search history.

(56) References Cited

U.S. PATENT DOCUMENTS 3,468,392 A * 9/1969 Hass .......................... 180/281

(Continued)

FOREIGN PATENT DOCUMENTS

DE          2 215 674          5/1973

(Continued)

*Primary Examiner*—Glenn Dayoan
*Assistant Examiner*—Paul A Chenevert
(74) *Attorney, Agent, or Firm*—Antonelli, Terry, Stout & Kraus, LLP.

(57) ABSTRACT

A device for a motor vehicle provides occupant protection during the impact of energy directed laterally against a motor vehicle door (6) as a result of a collision. The device has a connecting structure (7) including a first part (T1) and a second part (T2). The first part is firmly connected to the motor vehicle door (6) and the second part (5) is firmly connected to an energy-absorbing area of the motor vehicle body (5) located in the interior of the motor vehicle (1). The two parts are actively connected by at least one common joining section (F) for diverting at least part of the impact of energy acting laterally on the motor vehicle door into the area of the body of the motor vehicle. At least one of the first and second part comprise a transferable material which changes in mechanical state and in particular shape due to which the two parts are made to adjoin and interlock.

19 Claims, 3 Drawing Sheets

U.S. PATENT DOCUMENTS

| | | | | |
|---|---|---|---|---|
| 3,819,228 | A * | 6/1974 | Cornacchia | 296/146.9 |
| 4,307,911 | A * | 12/1981 | Pavlik | 296/187.12 |
| 4,462,633 | A * | 7/1984 | Maeda | 296/187.12 |
| 5,029,934 | A * | 7/1991 | Schrader et al. | 296/146.1 |
| 5,110,176 | A * | 5/1992 | Curtis | 296/187.12 |
| 5,800,007 | A * | 9/1998 | Cho | 296/146.6 |
| 6,053,565 | A * | 4/2000 | Cho | 296/187.12 |
| 6,193,303 | B1 * | 2/2001 | Urushiyama et al. | 296/187.03 |
| 6,312,045 | B2 * | 11/2001 | Kitagawa | 296/187.12 |
| 6,969,110 | B2 * | 11/2005 | Ali et al. | 296/187.12 |
| 2005/0088011 | A1 * | 4/2005 | Suzuki et al. | 296/187.03 |
| 2008/0290693 | A1 * | 11/2008 | Melz et al. | 296/187.12 |
| 2009/0021048 | A1 * | 1/2009 | Melz et al. | 296/187.12 |

FOREIGN PATENT DOCUMENTS

| | | |
|---|---|---|
| DE | 41 25 299 C2 | 2/1993 |
| DE | 196 33 637 A1 | 2/1998 |
| DE | 198 39 519 A1 | 3/2000 |

\* cited by examiner

DEVICE FOR A MOTOR VEHICLE THAT AFFORDS OCCUPANT PROTECTION DURING THE IMPACT OF ENERGY DIRECTED AGAINST A MOTOR VEHICLE DOOR AS A RESULT OF A COLLISION

BACKGROUND OF THE INVENTION

1. Field of the Invention

The present invention relates to a device for a motor vehicle that affords occupant protection during the impact of energy directed against a motor vehicle door.

2. Description of the Prior Art

Occupant protection in motor vehicles is a major concern in the construction and development of new motor vehicles. A development goal is designing a distinct crumble zone in the front and rear part of the vehicle capable of protecting the occupant compartment in collisions from the front and the rear. Occupant protection, however, presents greater problems in collisions from the side due to the short deformation path and the minimal absorption capacity of the lateral structure of the vehicle. Prior art solutions to mitigate occupant risk in lateral collisions provide for reinforcement of the vehicle door. For example, molding integrated in the vehicle door is known which possesses great rigidity in the transverse direction of the vehicle and/or possesses great capacity to absorb energy. For example, DE 196 33 637 A1 describes a vehicle door with lateral impact protection in which the door frames are provided with arch-shaped stay bars which are twisted during collision and deformed under tensile load in such a manner that the effect is similar to that of a guard net.

However, such reinforcement of the side doors by providing corresponding longitudinal beams is not always sufficient enough to protect the occupants in bad collisions as the side door can be pressed through the door opening of the vehicle body upon impact of external forces so that the occupant survival space is drastically reduced and consequently chances of survival.

Furthermore, in the state of the art, a series of measures are known that are suited to transfer forces acting on the side door to the body of the motor vehicle, for example by corresponding large-scale overlapping between the door and the door opening or by bolts extending from the edge of the door. In the case of a collision the bolts mesh in reinforced recesses in the door opening of the motor vehicle body. DE AS 22 15 674 describes a means of reinforcing a motor vehicle door essentially comprising an outward-curving beam whose end sections enter corresponding stable recesses when the beam is deformed as the result of an external impact. The beam preferably comprises molded steel sheet formed into the respective shape.

To prevent the preceding measures from increasing the weight of the motor vehicle, DE 41 25 299 C2 describes a means of reinforcing a motor vehicle door, comprising an arch-shaped reinforcement means made of fiber-reinforced composite material for weight reduction. In this case, too, the reinforcement device is located completely inside the door. The reinforcement device comes out of the door with its end sections only in a collision as a result of the deformation of the reinforcement beam. The end sections, in turn, then enter an active connection with the stable support flanks in the door frame of the motor vehicle body.

DE 198 39 519 A1 describes a passenger compartment that provides a transverse beam construction as a means of occupant protection in a lateral collision. In a collision, the transverse beam construction creates a rigid transverse connection between the vehicle door and the center console in such a manner that the seat area in front of the area where the vehicle door enters the passenger compartment should be protected. The transverse beam construction only appears if there is a collision in that pyrotechnical or pneumatic actors extend a hinged cross beam construction, which is otherwise integrated in the seat, door and covering of the console covering, forming a stable transverse connection.

SUMMARY OF THE INVENTION

Based on the aforedescribed state of the art, the present invention provides an optimized occupant protection system which is able to afford greater occupant protection during lateral impact or a lateral-impact-like collision situation. In particular, the improved protection system is in such a manner that the deformation energy acting laterally on the vehicle door in a collision is selectively diverted safely away from the area of the vehicle door to prevent drastic reduction of the occupant compartment by collision-caused deformation of the vehicle door and parts of the door injuring the occupants upon penetrating the compartment.

A device in accordance with the invention for a motor vehicle that affords occupant protection during the impact of energy directed laterally against a motor vehicle door as a result of a crash, including a connecting structure comprises at least a first and a second part, the first part being connected to the door of the vehicle and the second part being connected to an energy absorbing region of the motor vehicle body located in the interior of the vehicle, the two parts being brought into an active connection via at least one common joining section to selectively divert at least a part of the impact energy acting laterally on the motor vehicle door into the energy absorbing region of the body of the vehicle, at least one of the two parts comprising a transformable material which in response to an energy input to the transformable material alters the mechanical state of at least one of the first and second parts and preferably alters the shape of the at least one of the first or second parts comprising the transformable material which causes the two parts to adjoin, interlock and reversibly unlock.

In contrast to the earlier described prior art solutions to increase the rigidity of motor vehicle doors, in which lateral-impact beams projecting through the motor vehicle door are provided which in a collision enter laterally the more stable areas of the body of the motor vehicle in order to in this manner divert in the extreme case the crash energy directed at the motor vehicle door transverse to the action direction, according to the printed publications DE-AS 2 215 674 and DE 196 33 637 A1, the present invention provides a stable connecting structure which is connected to the motor vehicle door, due to which the crash energy, in particular in a lateral impact scenario, is diverted essentially parallel to the action direction into a region of the motor vehicle body located in the interior of the motor vehicle. The connecting structure can, of course, also absorb, and selectively divert forces, directed against the side door acting from other directions on the motor vehicle door than the classical lateral impact direction. With the present invention, on the one hand, in the ideal case the functionality of the motor vehicle door remains unimpaired, that is the door can still be opened and closed freely just as before. On the other hand, however a connecting structure, which, when the door is closed, is flush between the motor vehicle door and the interior of the motor vehicle body, preferably, in the region of the substructure of the seat, has a stable support function for the impact energy acting, preferably, in longitudinal direction to the connecting structure in a crash situation. Moreover, repeatable locking and unlocking permits coupling with progressive so-called pre-crash sensors, for example in the form of optical or radar-based sensors, which are able to convey technically caused erroneous information on the critical extent of the detected situation and require greater analysis and evaluation input to confirm the report of an imminent crash and which on the other hand lowers the reaction time, for example, for locking. The described reversible locking renders possible erroneous information more tolerable and permits as a consequence greater overall safety. There are several embodiments for realizing a connecting structure according to these requirements.

In the simplest case, it is obvious to make the first and second part completely or partially out of a transformable material and to activate the same in a collision. Fundamentally, a multiplicity of different, state-of-the-art transformable materials, preferably solid-state transformable materials such as piezo-ceramics, electrostrictive ceramics, shape-memory alloys (SMA) can be employed. Such transformable materials permit direct use provided that the parts connected to the motor vehicle door and to the interior of the motor vehicle body are shaped in a manner that is suited for the connecting structure.

Furthermore, state-of-the-art are fluid transformable materials, such as for example piezo-polymers, electrorheological fluids, polymer gels and magnetorheological fluids, which, provided they are inside a suitably selected encapsulation, are, under circumstances, also suited for use within the scope of the connecting structure.

Using transformable materials in the connecting structure, permits selectively adjusting the rigidity and dampening behavior of the parts entering into an active connection in a collision and thus in the crash-relevant and occupant-relevant body-seat system. For example, transformable materials made of shape-memory materials are able to change shape by means of selective electrical current input in a predetermined manner and to simultaneously influence the material rigidity and/or material dampening properties. This property is advantageously utilized with the device in that a connecting structure made of a shape-memory material, which provides at least one joining section having at least two separatable parts and partial areas, is activatable by selective electrical energy input in a crash situation in such a manner that both parts enter a close and stable active connection via which the crash energy acting on the motor vehicle door along the connecting structure is selectively diverted into a stable area, preferably into the floor region of the motor vehicle or an energy-absorbing area.

In addition to the selective diversion of force along the connecting structure, the transformable material permits altering the rigidity behavior, the vibration behavior and the dampening behavior, by means of actively controlling a form of energy acting selectively on the transformable material, for example in the form of electrical, thermal or similar energy, while reducing physiological stress on the occupants inside the motor vehicle. Regulation and control of the rigidity behavior, and the dampening behavior of the transformable material can be carried out according to various desired functions, for example with reduced neck acceleration of the occupants inside the motor vehicle. The desired function depends basically on the age, weight, sex, size as well as the sitting positions of the occupants inside the motor vehicle.

The device of the invention can, of course, not only be successfully used in the side doors of a motor vehicle, and the connecting structure is also suited for stabilizing a hatchback. In the case of side doors, it has proven to be especially advantageous if that part of the connecting structure that is connected to the stable interior of the motor vehicle body is firmly in active connection with the motor vehicle body in the region under the motor vehicle seat. Such type fixation of the connecting structure provided in the interior of the motor vehicle is particularly physiologically gentle for the occupant(s) on the motor vehicle seat in crash situations, especially if the connecting structure is made of the aforedescribed transformable materials with the adjustable dampening and rigidity behavior.

The aforedescribed design of the connecting structure using transformable materials, however, does not necessarily presuppose activation of the transformable material by means of externally applied energy, such as for example electrical energy input. It is also possible to use the connecting structure designed in the aforedescribed manner solely passively in an advantageous manner. Thus, a connecting structure made of shape-memory material permits creation, and material adjustment of the rigidity and/or of dampening utilizing materials having inherent properties (for example, super elasticity or material hysteresis), which permits predetermined adjustment of the impact energy acting on the motor vehicle body during lateral impact and, therefore, acting on the occupant(s) seated on the motor vehicle seat.

Just as feasible is selective quasistatic adjustment of the material properties, and the component properties analogous to the above description. For example, if using shape-memory metals, it is feasible to use thermal activation for variable adjustment of the material hysteresis.

Furthermore, it is feasible to utilize the crash energy itself for producing a joining connection. The crash energy can be utilized to lock the parts of the connecting structure. An active element can subsequently effect separation of the parts to permit and to facilitate, opening the door and rescuing the occupants.

It is just as feasible to utilize the crash energy for activating the transformable material. In the case of a shape-memory metal, the mechanical energy can be converted into thermal energy by means of which the actual activation of the shape-memory effect is then achieved.

Moreover, preferred embodiments are feasible which provide complicatedly designed connecting structures. Thus it is feasible to design each first part and each second part of the connecting structure pair in such a manner that a parallel arrangement of the first parts and the second parts entering an active connection is possible. Thus, the first part can be a pipe and the second part can be a separate rod extending inside the pipe which connects the parts into an active connection upon transfer motion of the transformable material of at least one of the first and second parts. The two components can be made of different materials. Alternatively or in combination with the preceding variant, the second part can be divided in two in the longitudinal direction, with one section being made of the transformable material and the other of a conventional material. The preceding considerations are intended to show that there are practically no limits to the variety of different designs of the connecting structure to optimize the connecting structure for effectively diverting, and absorbing, the crash energy from the area of the motor vehicle door.

The device that affords occupant protection during the impact of energy directed against a motor vehicle door as the result of a collision is made more apparent in the following description of a single preferred embodiment with reference to the accompanying figure.

DESCRIPTION OF THE INVENTION

Figure 1:
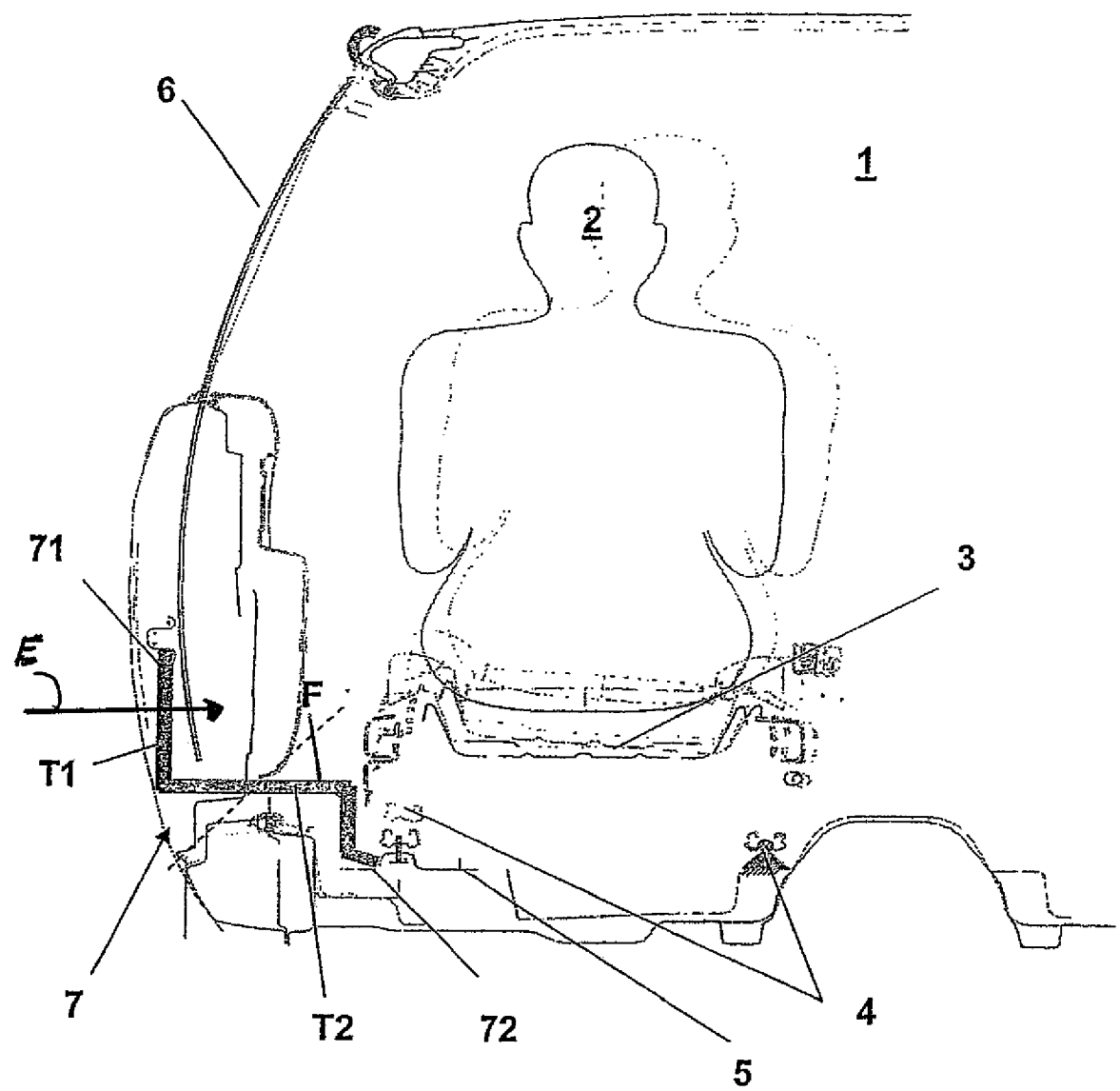
FIG. 1 shows an embodiment of the invention.

FIG. 1 shows a partial cross section of a motor vehicle, in whose interior 1 a person 2 is seated on a motor vehicle seat 3. The motor vehicle seat 3 is connected via corresponding locking elements 4 to the floor region of the body 5 of the motor vehicle. The manner in which the locking elements function is irrelevant here. A motor vehicle door 6, which is shown in a closed state in the cross section representation, is located to the left of the person 2. Of special significance is that the connecting structure 7, which is firmly hinged with its end 71 inside the motor vehicle door 6, is firmly connected with its end 72 to the floor region of the motor vehicle body 5. It is apparent that in the event of lateral impact on the motor vehicle door 6, the impact energy E is very effectively diverted via the connecting structure 7 into the floor region of the motor vehicle door 6 without any major deformation of the motor vehicle door 6 due to the fact that the connecting structure 7 has a longitudinal extension oriented in the active direction of the crash energy E. The energy E is conveyed along this longitudinal extension into the stable floor region of the body 5.

In order not to impair the motor vehicle door's manner of functioning, the connecting structure 7 is provided with at least one joining section F separating the connecting structure 7 into parts T1 and T2.

In order to ensure that, in a collision, the parts T1 and T2 of the connecting structure 7 enter a close, stable connection to divert the impact energy E into the floor region of the motor vehicle body 5 and to protect the person 2 against physiological injury, the joining sections are constructed in a corresponding manner and enter a stable active connection upon transformation of the transformable material. For possible preferred embodiments to realize such a type active connection of the two parts T1 and T2 reference is made to the preceding description and the description below regarding FIGS. 2 and 3.

The invention improves occupant protection in a lateral crash as well as in combination crash situations on which the invention is based is achieved by selective reduction of the physiological stress on the occupants in a crash by means of controlled influencing of the forces, accelerations and deformations, acting on the seat. This controlled influence can be achieved in an especially advantageous manner by designing a connecting structure between the motor vehicle door and the rigid areas of the substructure of the seat by selective use of a transformable material, for example a shape-memory material.

Figure 2:
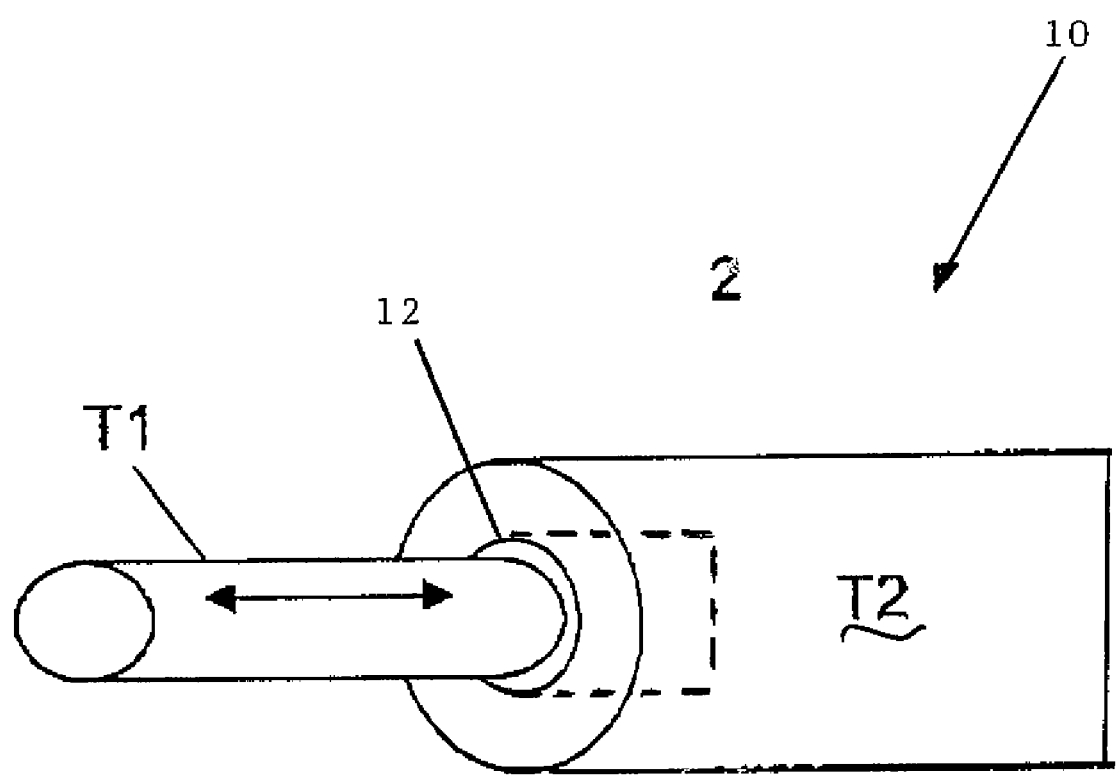
FIG. 2 shows an embodiment of the first and second parts as a pipe with a rod extending inside the pipe.

FIG. 2 illustrates an embodiment 10 of a possible spatial relationship between the parts T1 and T2 for achieving an active connection of a pipe T2 which receives a rod T1 which, upon a collision with the vehicle, receives an input of energy as described above, to transform the shape of at least one of the rod and pipe to cause the rod to be disposed within the recess 12 of the pipe T2 to achieve the active connection for transfer energy E into the body 5. The integration of the embodiment 10 into the at least one joining section F is not illustrated.

Figure 3:
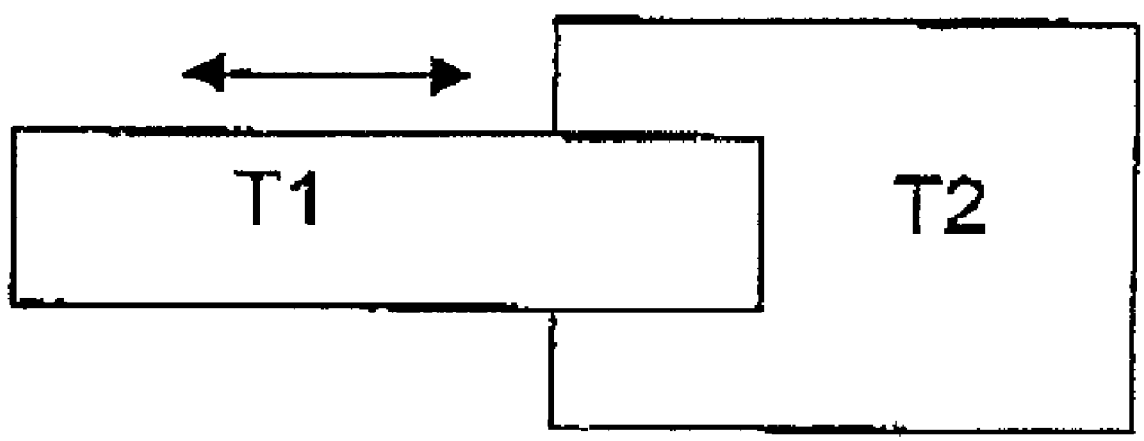
FIG. 3 shows another embodiment of the first and second parts in which the first part partially encloses and enters the second part.

FIG. 3 illustrates a third embodiment 20 in which the first part T1 at least one of encloses and enters the second part T2.

LIST OF REFERENCES 1 interior of the motor vehicle
2 person
3 motor vehicle seat
4 locking element
5 body of the motor vehicle
6 motor vehicle door
7 connecting structure
71 and 72 ends of the connecting structure

What is claimed is:

1. A device for a motor vehicle for providing occupant protection during an energy impact directed laterally against a door of the motor vehicle as a result of a collision, comprising a connecting structure including a first part and a second part, the first part being for connection to the door and the second part being for connection to an energy absorbing area of a body of the motor vehicle located in an interior of the motor vehicle and the parts being connectible by at least one section which diverts at least part of the energy impact directed laterally on the door into the energy absorbing area of the body; and wherein at least one of the parts comprises a shape transformable material which, due to an input of energy, changes in shape causing the parts to adjoin and interlock; and wherein the transformable material is made of at least one of: piezo-ceramics, piezo-polymers, electrostrictive ceramics, electrorheological fluids, polymer gels, magnetorheological fluids, shape-memory alloys, shape-memory polymers.

2. The device according to claim 1, wherein at least one of the parts comprising the transformable material undergoes a change in shape before and during the energy impact directed to the door caused by the collision so that the two parts provide a reversible active connection.

3. A device according to claim 1, wherein the motor vehicle comprises an approach sensory mechanism for detecting an unavoidable collision which generates a signal causing at least one of an active element and an intelligent structure to be activatable.

4. The device according to claim 1, wherein the door is a side door and the second part is attached in a floor region of the body next to or under a substructure of a seat.

5. The device according to claim 1, wherein the change in shape influences at least one of vibration and dampening behavior of the transformable material.

6. The device according to claim 1, wherein the input of energy to the transformable material is independent of the energy input from the collision.

7. The device according to claim 1, wherein the parts are interlockable.

8. The device according to claim 7, wherein the transformable material is made of at least one of: piezo-ceramics, piezo-polymers, electrostrictive ceramics, electrorheological fluids, polymer gels, magnetorheological fluids, shape-memory alloys, shape-memory polymers.

9. The device according to claim 1, wherein the parts adjoin at the at least one section upon closing the door.

10. The device according to claim 9,
wherein the parts are interlockable.

11. The device according to claim 9,
wherein the transformable material is made of at least one of: piezo-ceramics, piezo-polymers, electrostrictive ceramics, electrorheological fluids, polymer gels, magnetorheological fluids, shape-memory alloys, shape-memory polymers.

12. The device according to claim 1,
wherein at least one of the parts has a contour matching a contour in the at least one section.

13. The device according to claim 12,
wherein the parts adjoin at the at least one section upon closing the door.

14. The device according to claim 12,
wherein the parts are interlockable.

15. The device according to claim 12,
wherein the transformable material is made of at least one of: piezo-ceramics, piezo-polymers, electrostrictive ceramics, electrorheological fluids, polymer gels, magnetorheological fluids, shape-memory alloys, shape-memory polymers.

16. The device according to claim 12,
wherein the first part at least one of partially encloses and partially enters the second part.

17. The device according to claim 16,
wherein the parts adjoin at the at least one joining section upon closing the door.

18. The device according to claim 16,
wherein the parts are interlockable.

19. The device according to claim 16,
wherein the transformable material is made of at least one of: piezo-ceramics, piezo-polymers, electrostrictive ceramics, electrorheological fluids, polymer gels, magnetorheological fluids, shape-memory alloys, shape-memory polymers.

\* \* \* \* \*